United States Patent [19]
Koch et al.

[11] Patent Number: 6,113,183
[45] Date of Patent: Sep. 5, 2000

[54] PRIVACY SHROUD FOR AIRCRAFT SEATS

[75] Inventors: Roger Koch, Miami Shores; Michael L. Oleson, Fort Lauderdale, both of Fla.

[73] Assignee: Aircraft Modular Products, Inc.

[21] Appl. No.: 08/929,330

[22] Filed: Aug. 30, 1997

[51] Int. Cl.[7] .................................................. A47C 31/00
[52] U.S. Cl. ................. 297/184.14; 297/162; 297/184.1; 297/217.1
[58] Field of Search ........................... 297/217.1, 184.14, 297/184.1, 463.1, 463.2, 184.11, 160, 161, 162

[56] References Cited

U.S. PATENT DOCUMENTS

| | | |
|---|---|---|
| 604,341 | 5/1898 | Tustison ............................ 297/217.1 X |
| 1,416,518 | 5/1922 | Smiley ...................................... 297/160 |
| 2,078,975 | 5/1937 | Roberts ........................... 297/184.14 X |
| 3,467,432 | 9/1969 | Sullivan .................... 297/162 |
| 4,440,443 | 4/1984 | Nordskog . |
| 4,685,726 | 8/1987 | Wolpert, Jr. .......................... 297/162 X |
| 4,784,433 | 11/1988 | Purnell-Ayres . |
| 4,834,449 | 5/1989 | Engelman ............................ 297/162 X |
| 4,865,381 | 9/1989 | Van Rogue . |
| 4,947,883 | 8/1990 | Mayo . |
| 5,074,615 | 12/1991 | Honig ....................................... 297/161 |
| 5,123,707 | 6/1992 | Wurzell . |
| 5,330,251 | 7/1994 | McGuire ........................... 297/184.1 X |
| 5,765,911 | 6/1998 | Sorenson ............................... 297/161 X |

*Primary Examiner*—Peter M. Cuomo
*Assistant Examiner*—Stephen Vu
*Attorney, Agent, or Firm*—Malloy & Malloy, P.A.

[57] ABSTRACT

A privacy shroud assembly specifically designed to increase the privacy of an occupant of a chair structure when the chair structure is in a reclined position for extended periods of rest or sleep. The assembly includes a supporting base fixed to the support surface on which the chair structure is mounted and a shroud or shield portion movably coupled to the base so as to be selectively positionable between a stored position and an operative position. The operative position is at least partially defined by an upward and outward position of the shield portion in a somewhat rearward orientation to the chair structure and in at least partially surrounding relation to the reclined backrest and, of course, an upper body portion of an occupant thereon. A cover structure may be movably mounted so as to selectively close or open an open top of the shield portion thereby adding to an occupant's privacy and blocking or restricting ambient light from entering the area where the occupant on the reclined chair structure rests.

15 Claims, 2 Drawing Sheets

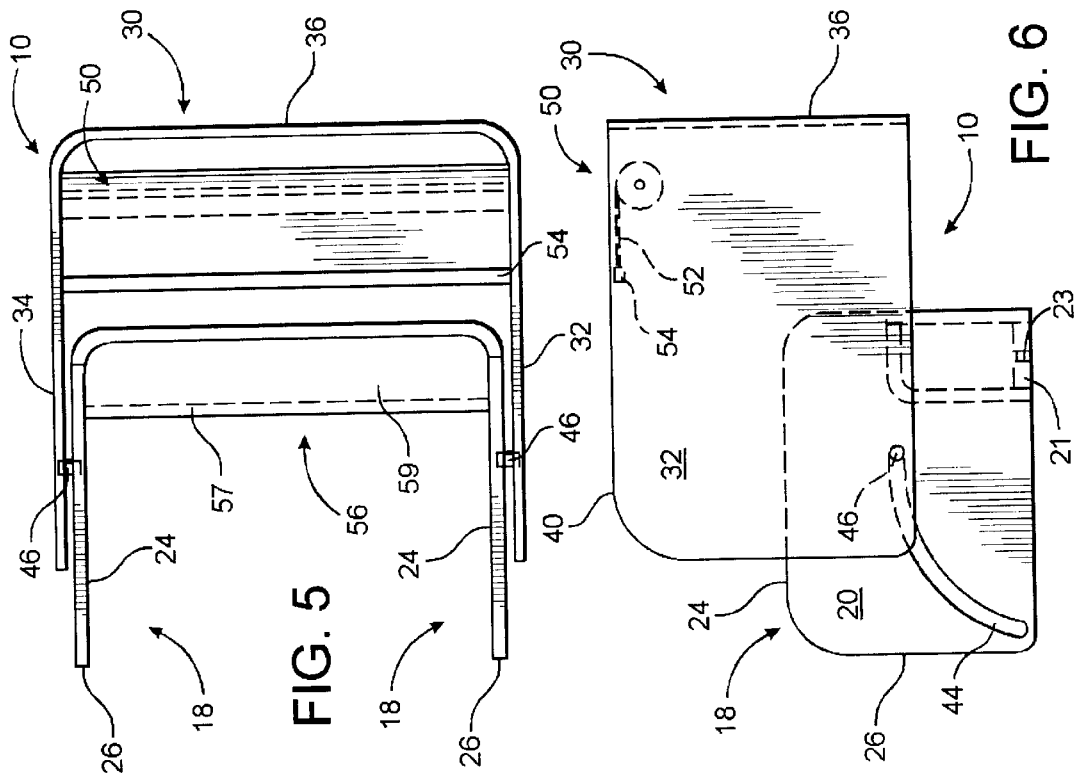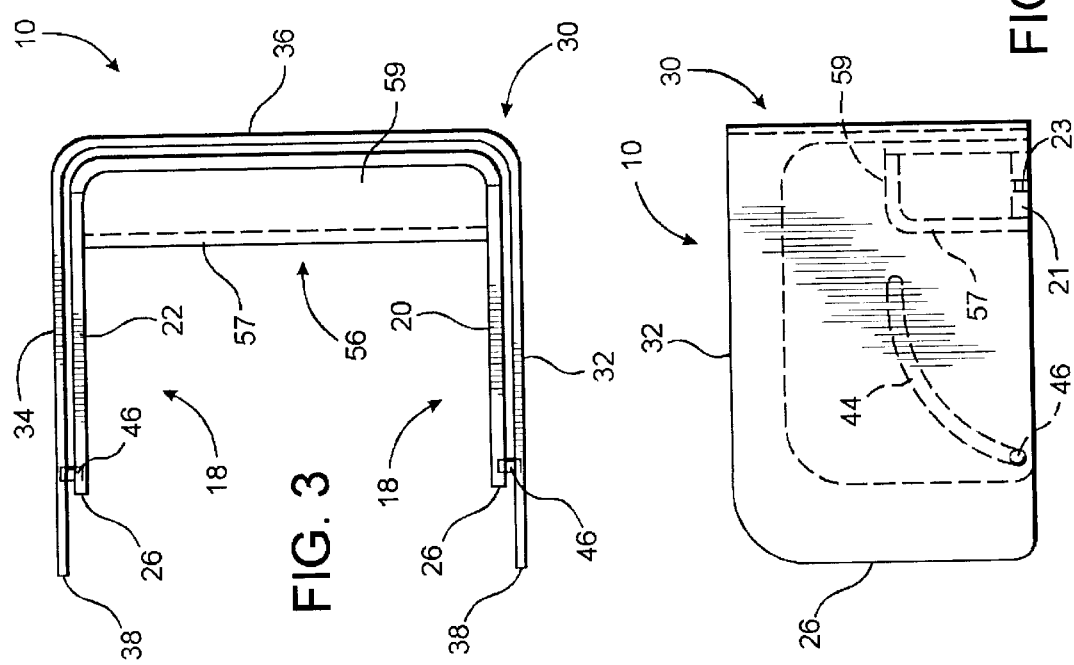

PRIVACY SHROUD FOR AIRCRAFT SEATS

BACKGROUND OF THE INVENTION

1. Field of the Invention

This invention relates to a privacy shroud assembly particularly adapted to be useable with reclining seats such as of the type found on both commercial aircraft and private multi-passenger aircraft. The privacy shroud of the present invention can be selectively positioned into and out of surrounding, segregating relation to a passenger occupying a reclining seat, particularly when the seat is in a fully reclined position. Structural features are further provided to at least partially restrict ambient light from entering the area occupied by a passenger when the passenger is supported on the backrest of the chair structure in a reclined position.

2. Detailed Description of the Preferred Embodiment

The use of reclining seats has been well known for many years. The popularity of reclining seats is evident given their extensive domestic or household use as well as commercial applications such as in movie theaters, public viewing arenas or any applicable location wherein the occupant of the chair structure is expected to be seated for a relatively long period of time.

In the area of air travel, both commercial aircraft and private multi-passenger aircraft have adapted almost exclusively the use of reclining seat structures for passengers during travel. In the aircraft industry, such chair structures must meet certain strength and crash requirements of the Federal Aviation Administration (FAA), while at the same time it is, of course, highly desirable that a certain amount of comfort be available to the occupant, especially when travelling relatively long distances. However, because of the space requirements and the necessity, particularly in commercial airlines, to increase the passenger load, the use of reclining seats or chair structures has been somewhat limited to the structures which only recline a relatively small or minimal amount. Also, when the passenger is trying to rest or even sleep in such a reclined position there is almost a total lack of privacy because of the closeness of the next adjacent passenger. Also, because of the space requirements there is almost a complete lack of any type of structure which would at least partially enclose the passenger during periods of rest or sleep to increase his privacy. The above situation exists even in so-called "first class" portions of the passenger cabins wherein more space is allotted on a per passenger basis because of the higher prices charged passengers for traveling in such areas. However, there are still no devices which are commonly used in such portions of the passenger cabin which are specifically designed to increase the privacy of individual passengers by shielding or segregating them from surrounding passenger areas particularly during desired rest periods.

Therefore, there is a need in the art for an assembly which is specifically designed to allow or define an area of increased privacy for each passenger or occupant, particularly when such passenger assumes a reclined position for resting or sleep. A preferred privacy structure would adequately and efficiently segregate at least a portion of the passenger's body from surrounding passengers in a manner which will not only increase his privacy but block or at least restrict his exposure to ambient light during rest periods. Naturally, the structure of such an improved privacy increasing assembly should have sufficient structural integrity to meet all FAA strength requirements, while also being perfectly safe when used in combination with any type of fully reclining seat structure, so as to ensure and maintain the safety of an occupant or passenger during all phases of operation of an aircraft or any other vehicle. In addition, such a preferred or improved assembly to increase the privacy of individual passengers should be dimensioned and configured to at least partially surround the passenger or occupant of the seat structure when the seat structure is in a fully reclined position. Accordingly, the structure of any type of preferred privacy assembly should be specifically adapted for use in combination with a chair structure which has the capability of being fully reclined so that the passenger or occupant may assume a substantially horizontal position for best facilitating rest or sleep over long periods of time.

SUMMARY OF THE INVENTION

The present invention is directed towards a privacy shroud assembly designed to be used in a manner which increases or ensures a certain amount of privacy to an occupant of a chair structure, when the chair structure is disposed in a reclined position. The privacy shroud assembly of the present invention is particularly adapted for use on aircraft and, particularly, both aircraft associated with commercial airline use as well as multi-passenger private aircraft. More specifically, the privacy shroud assembly of the present invention includes a base portion fixedly secured to the floor of the aircraft or other support surface on which a correspondingly positioned chair structure is mounted. The base portion is disposed in immediately adjacent or at least partially surrounding relation to opposite sides and generally the rear area portion of the chair structure. The preferred privacy shroud assembly further includes a shield portion which is selectively positionable relative to the base portion between a stored position and an operative position. The shield portion includes spaced apart, oppositely disposed, side walls disposed in generally parallel relation to one another. An end portion extends between corresponding ends of the sidewalls in interconnecting relation thereto. The shield portion further includes an open top and an open front end. These openings are dimensioned and configured so as to allow the extension therethrough of portions of the chair structure depending upon the particular position or attitude assumed by the chair structure.

The stored position of the shield portion is defined by a somewhat surrounding relation to the base portion and to a seat or lower end of the chair structure. Also, when the shield portion is in the stored position it assumes a low profile position which promotes unobstructed views of the passenger and facilitates talking or communication of the passenger with others. In addition, no vertical cabin space above the passenger is utilized when the shield portion is in the low profile position. The shield portion is movably coupled to the base portion so as to be positionable relative thereto into the aforementioned operative position. Such operative position may be further defined by an upward and somewhat outward or rearward disposition of the shield portion relative to the base and what may be considered a rear portion of the chair structure. In such position, it is disposed to at least partially surround the backrest of the chair structure when such backrest is in preferably a fully reclined position itself being defined by a somewhat horizontal orientation.

Additional structural features of the subject privacy shroud assembly include a cover assembly which may be movably mounted on the shield portion and selectively positionable between an open position and a closed position relative to the open top area of the shield assembly. When in the closed position, the cover assembly serves to at least partially close the open top of the shield portion and somewhat overlie or cover the upper torso portion of an occupant of the chair structure when the backrest is in its reclined position. The cover assembly may include a variety of different cover structures such as a flexible material cover structure which is rolled upon itself while being stored. Ultimately, a flexible material sheet may be selectively positionable along some type of supporting attachment so that, as set for above, this flexible sheet may be disposed in a closed relation to the open top of the shield portion thereby serving to provide privacy as well as restrict or completely block the ambient light from entering the area occupied by the passenger of the chair structure.

BRIEF DESCRIPTION OF THE DRAWINGS

For a fuller understanding of the nature of the present invention, reference should be had to the following detailed description taken in connection with the accompanying drawings in which:

FIG. 3 is a top view of the privacy shroud assembly of the present invention.

FIG. 4 is a side view of the embodiment shown in FIG. 3.

FIG. 5 is a top view of the privacy shroud structure of the present invention in an operative position.

FIG. 6 is a side view of the embodiment shown in FIG. 5.

Like reference numerals refer to like parts throughout the several views of the drawings.

DETAILED DESCRIPTION OF THE PREFERRED EMBODIMENT

Figure 1:
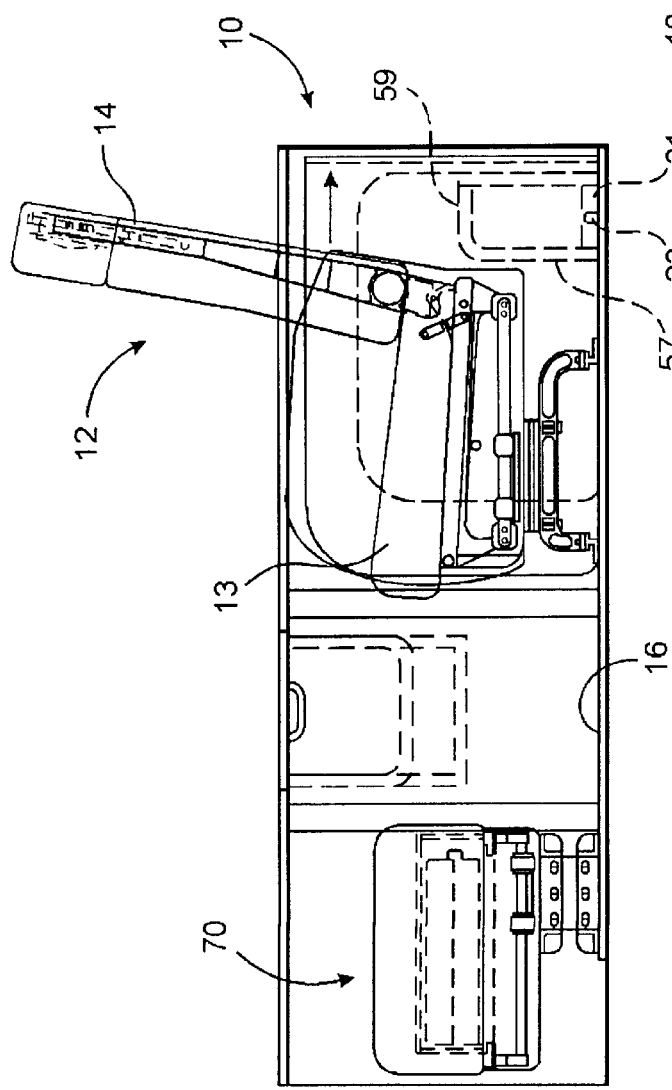
FIG. 1 is a side view of the present invention in combination with a reclining chair structure of the type found in aircraft.
Figure 2:
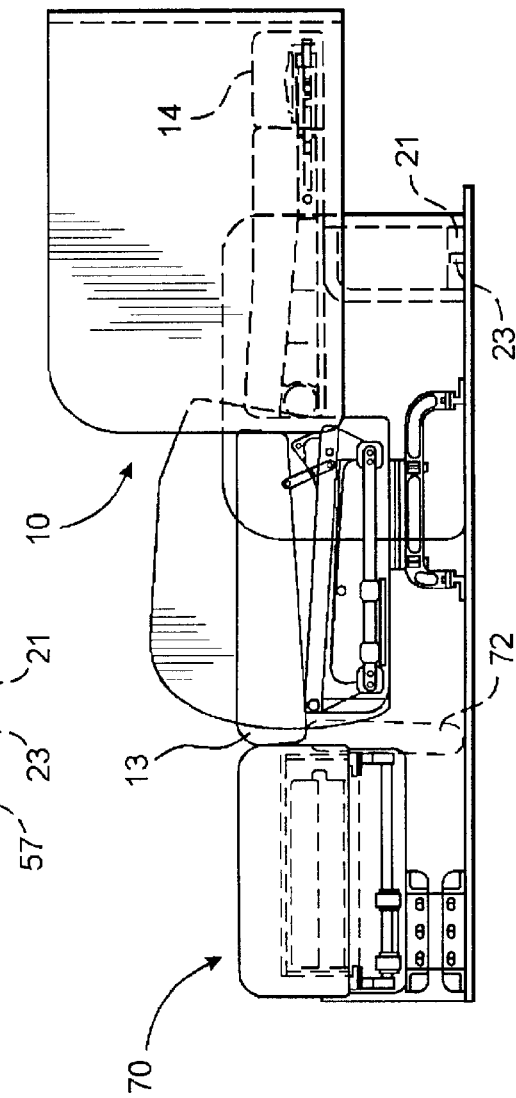
FIG. 2 is a side view of the embodiment shown in FIG. 1 wherein the chair structure is in a fully reclined position.

As shown throughout the Figures, the privacy shroud assembly of the present invention is generally indicated as 10 and as more specifically shown in FIGS. 1 and 2, it is designed to be used in combination with a chair structure 12. The chair structure 12 is represented as being of the type having a backrest 14 which is fully reclinable into a substantially horizontally oriented, support position, as best shown in FIG. 2. Such a chair structure 12 is specifically adapted for use on an aircraft and is mounted on the floor of the aircraft as at 16 or on some other support surface when such chair structure 12 is not used on an aircraft but in some other type of vehicle or stationary establishment.

With reference to FIGS. 3–6, the privacy shroud assembly of the present invention comprises a base generally indicated as 18 including oppositely disposed, spaced apart, side panels 20 and 22 disposed in substantially spaced relation to one another. The base 18 further includes an open top portion as at 24 and an open front end as at 26. Both the top portion 24 and the front end 26 are disposed and configured to allow at least a portion of the chair structure 12 to extend therethrough. The portion passing through the respective open portions of the base 18 is dependent upon the position of the chair structure 12 and also the angular orientation of the backrest 14. The base 18 is secured to the floor portion 16 by an anchor plate as at 21 having connectors as at 23 passing therethrough and into preformed tracks disposed in parallel relation to one another. Such tracks are of the type normally found in the flooring 16 of aircraft for the mounting of seats and other furniture structures thereon.

The privacy shroud assembly of the present invention further includes a shield portion generally indicated as 30 and movably mounted or coupled to the base portion 18 so as to be selectively positionable between a stored position, as shown in FIGS. 1, 3 and 4 and an operative position, as shown in FIGS. 2, 5 and 6. The shield portion 30 comprises oppositely disposed spaced apart, side walls 32 and 34 oriented in a generally parallel relation to one another and an at least partially closed rear end 36. The front end as at 38 is open as is the top as at 40. The opening of the front end 38 of the shield portion 30 is dimensioned and configured to allow extension therethrough of the chair structure 12 and particularly the seat portion 13 thereof and the side panels 20 and 22 of the base. Similarly, when in its stored position, the open top of the shield portion 30 is dimensioned and configured to allow the backrest 14 of the chair structure 12 to extend therethrough particularly when it is in an upright or a partially reclined position, as best shown in FIG. 1.

With regard to FIGS. 3–6, the shield portion 30 is movably coupled to the base 18 such that the shield portion 30 may be selectively positionable between the stored position (FIGS. 1, 3 and 4) and the operative position (FIGS. 2, 5 and 6). In the stored position, the shield portion 30 somewhat surrounds and is located outboard of the base 18. Their correspondingly or generally similar configurations allow for a compact mutual positioning of both the base 18 and shield portion 30 when in the aforementioned stored position. Further, in this stored position both at least partially surround a lower or seat portion 13 of the chair structure 12 (See FIG. 1). Also, when the shield portion is in the stored position it assumes a low profile position which promotes unobstructed views of the passenger and facilitates talking or communication of the passenger with others. In addition, no vertical cabin space above the passenger is utilized when the shield portion is in the low profile position.

When the shield portion 30 is moved to its operative position it assumes an upward and substantially outward or rearward orientation relative to base portion 18 and seat structure 12, as shown in FIGS. 2 and 6. In such a position the backrest 14 may be disposed in its fully reclined position so as to provide, at least in part, a substantially horizontally oriented support surface on which a passenger or occupant may comfortably recline. Relative movement of the shield portion between its stored position and operative position is accomplished by a track assembly 44 including, in a preferred embodiment, one track each formed in or at least on the outermost surface of the opposite side panels 20 and 22 (See FIGS. 4 and 6). These track structures 44 include a somewhat arcuate or curvilinear configuration such that a coupling member as at 46 formed on the inside surface of both of the side panels 33 and 34 of the shield portion 30, may be disposed and dimensioned to travel, in a sliding relation within the correspondingly positioned track structures 44. The overall configuration, as set forth above, allows the preferred orientation of the shield portion 30 to freely travel selectively between the stored position and operative position. Once in its operative position, the overall configuration of the shield portion 30 is such as to at least partially surround the backrest 14 when it is in its fully reclined position, as shown in FIG. 2. This, of course, greatly increases segregation of the occupant lying on the backrest 14, from surrounding passengers or passenger areas. The positioning of the shield portion 30 may be accomplished manually as by mechanically moving it between the stored and operative positions. Alternately, electronic control means including appropriate structural linkage may be utilized and be accessible to the passenger for selective positioning of the shield portion 30.

A preferred feature of the present invention is to also provide a cover assembly including, in one preferred embodiment, a cover structure generally indicated as 50. The cover structure 50 includes a cover element 52 which preferably is formed of a flexible, somewhat resilient and light impermeable material. This cover element 52 may be extended from its stored or rolled position to an outwardly extending position partially represented in FIG. 5. In such a position the leading edge 54 and a remainder of the cover element 52 may extend completely or at least partially across the open top 40 of the shield portion so as to somewhat overlie and at least partially cover the backrest 14 and any person reclined thereon. Also, the positioning of the cover element 52 in the outwardly extended or closed position relative to the open top 40 will allow light to be blocked or restricted from entering into the area occupied by the backrest 14 and any occupant thereon.

Yet additional structural features of the present invention include a support structure 56 mounted somewhat on the interior of the base 18 and fixedly secured thereto. This support structure 56 includes an upper plate 59 and a supporting wall as at 57. The plate 59 is located at a height (See FIG. 2) sufficient to supportingly engage the rear surface of the backrest 14 when it is in its reclined position. When in such position, additional weight would be placed thereon by the presence of an occupant or passenger. Accordingly, the presence of the support structure 56 is such as to provide adequate support as clearly shown.

Other structural features particularly relating to the chair structure 12 include the presence of either a footrest 72 or ottoman type structure generally indicated as 70. Alternately, when room for such an ottoman 70 does not exist a footrest as at 72 may be provided which selectively assumes an outwardly extending position on which the feet of an occupant can rest when the backrest is in the fully reclined position.

Since many modifications, variations and changes in detail can be made to the described preferred embodiment of the invention, it is intended that all matters in the foregoing description and shown in the accompanying drawings be interpreted as illustrative and not in a limiting sense. Thus, the scope of the invention should be determined by the appended claims and their legal equivalents.

Now that the invention has been described,

What is claimed is:

1. A privacy shroud assembly designed for use with a chair structure having a reclining backrest, said assembly comprising:
   a) a base adapted to be fixedly secured to a support surface on which the chair structure is mounted,
   b) a shield portion movably connected to said base and selectively positionable relative thereto between a stored position and an operative position,
   c) said operative position defined by a substantially upward and outward disposition of said shield portion relative to said base,
   d) said shield portion comprising spaced apart side walls, a back portion interconnecting corresponding ends of said side walls, an open front end, and an at least partially open top,
   e) said open front end and said open top dimensioned and configured to allow extension therethrough of a portion of the chair structure,
   f) said shield portion disposed and configured to substantially surround a portion of the chair structure when said shield portion is in said operative position, and
   g) a track assembly mounted on said base, at least one coupling member secured to said shield portion and disposed in sliding engagement with said track assembly, said track assembly disposed to orient said shield portion between said stored position and said operative position.

2. An assembly as recited in claim 1 wherein said base includes spaced apart side panels each disposed adjacent an opposite side of said chair structure and adjacent and substantially parallel to correspondingly positioned sidewalls of said shield portion.

3. An assembly as recited in claim 2 wherein said base further includes an open front end and an open top both dimensioned and disposed to allow extension of the chair structure therethrough when the chair structure is in an upright or reclined position.

4. An assembly as recited in claim 3 wherein said base further includes a rear end disposed in spaced relation to a rear portion of the chair structure and further configured and disposed in a continuous relation to the backrest when in a reclined position.

5. An assembly as recited in claim 4 wherein said base further includes a support structure disposed substantially adjacent said rear end and positioned in supporting engagement with the backrest when in a reclined position.

6. An assembly as recited in claim 2 wherein said base and said shield portion are relatively dimensioned and configured to substantially surround a lower portion of the chair structure when said shield portion is in said stored position.

7. An assembly as recited in claim 6 wherein said shield portion is correspondingly configured relative to said base so as to be disposed in surrounding, relation thereto when said shield portion is in said stored position.

8. An assembly as recited in claim 1 wherein said base includes spaced apart side panels each disposed adjacent an opposite side of said chair structure and adjacent and substantially parallel to correspondingly positioned sidewalls of said shield portion;

said track assembly comprising two track members each disposed on an outer surface of a different one of said side panels, said shield portion comprising two coupling members each formed on an inner surface of a different one of said side walls and extending outwardly therefrom into sliding engagement with a correspondingly positioned one of said track members.

9. An assembly as recited in claim 8 wherein each of said coupling members are cooperatively dimensioned and configured relative to said track members to allow travel along a length thereof as said shield portion moves between said stored position and said operative position.

10. An assembly as recited in claim 1 further comprising a cover structure including a supporting attachment structured to movably mount said cover structure on said shield portion, said cover structure positionable between an open position and a closed position relative to said open top of said shield portion.

11. An assembly as recited in claim 10 wherein said closed position is defined by said cover structure being disposed in a reclined position relative to a portion of said backrest.

12. An assembly as recited in claim 11 wherein said cover structure includes a cover portion extending between said side walls when disposed in both said open and closed positions and being movable relative thereto along said open top when moved from said open position to said closed position of said open top.

13. An assembly as recited in claim 12 wherein said cover portion is formed of a flexible material disposable in an overlapping, rolled orientation when in slid open position.

14. An assembly as recited in claim 12 wherein said cover portion is formed of a flexible material sheet retractable from said closed position to said open position.

15. An assembly as recited in claim 12 wherein said cover portion is formed from a substantially flexible, light, impermeable material structured to shield ambient light from the chair structure when in a reclined position.

* * * * *